United States Patent [19]

Adams

[11] Patent Number: 5,081,787
[45] Date of Patent: Jan. 21, 1992

[54] METHOD AND APPARATUS FOR HANDLING SALMON EGGS

[76] Inventor: Billy L. Adams, 4860 Wandering Cir., Colorado Springs, Colo. 80917

[21] Appl. No.: 494,577

[22] Filed: Mar. 16, 1990

[51] Int. Cl.⁵ .............................................. A01K 97/04
[52] U.S. Cl. .............................................. 43/55; 43/4
[58] Field of Search ............... 43/4, 4.5, 54.1, 55, 43/56; 206/315.11, 529, 229; 221/211, 199; 294/1.2

[56] References Cited

U.S. PATENT DOCUMENTS

| | | | |
|---|---|---|---|
| 1,556,127 | 10/1925 | Pruelt | 43/55 |
| 1,986,742 | 1/1935 | Mosher | 43/55 |
| 2,216,202 | 10/1940 | Lake | 43/56 |
| 2,502,816 | 4/1950 | Bennek | 43/54.1 |
| 2,968,887 | 1/1961 | Woolworth | 43/56 |
| 3,647,380 | 3/1972 | Middleton | 294/1.2 |
| 4,071,272 | 1/1978 | Ordlik | 294/1.2 |
| 4,118,807 | 10/1978 | McCauley | 43/4 |
| 4,133,452 | 1/1979 | Wiltrout | 221/185 |
| 4,226,335 | 10/1980 | Sowards | 221/185 |
| 4,332,408 | 6/1982 | Cointment | 294/1 |
| 4,428,146 | 1/1984 | Walker | 43/55 |
| 4,450,647 | 5/1984 | Schmidt | 43/4 |

*Primary Examiner*—Kurt Rowan
*Assistant Examiner*—James Miner
*Attorney, Agent, or Firm*—Chernoff, Vilhauer, McClung & Stenzel

[57] ABSTRACT

A bait handling tool and a method for its use, the bait handling tool resembling a medicine dropper with a squeeze bulb, an elongate body, and a bowl of stiff or hard material at the end of the body opposite the squeeze bulb, defining a generally hemispherical socket for picking up an individual salmon egg or similar piece of bait from the jar and holding it by suction provided by the squeeze bulb while the egg or other piece of bait is placed on the point of a hook for use as bait. A jar holder for holding a jar of salmon eggs or other small individual pieces of fish bait protects a glass jar and includes a clip for fastening the jar holder to a belt or a pocket of a user, and also includes a loop for carrying the bait handling tool. The jar holder may also include a bracket defining small holes for attachment of spare hooks or swivels for convenient use.

8 Claims, 2 Drawing Sheets

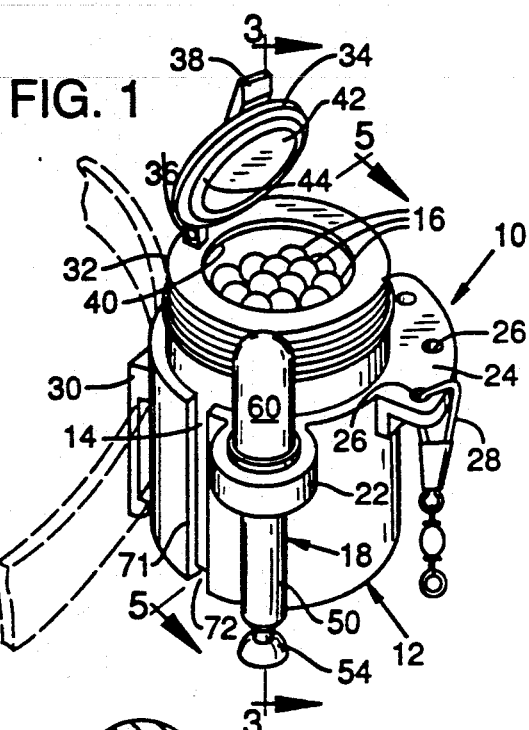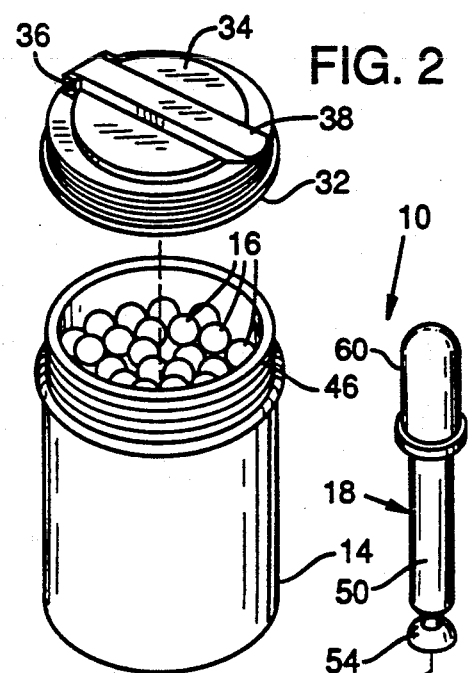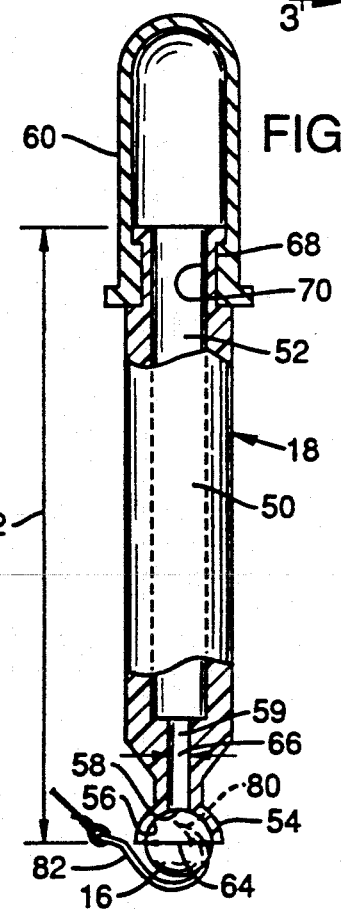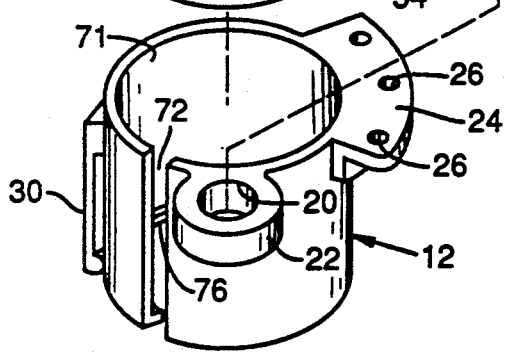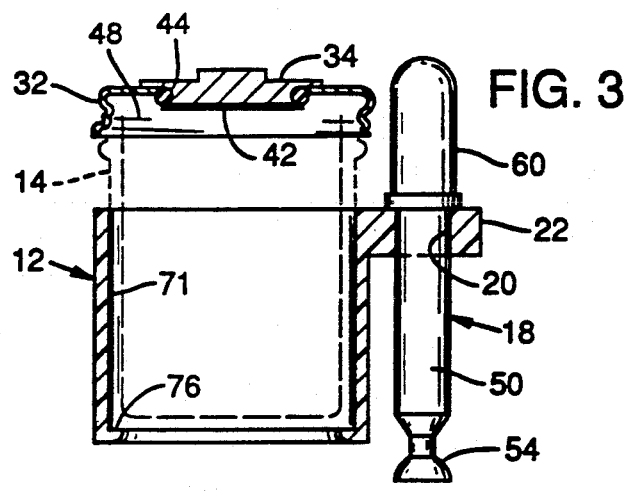

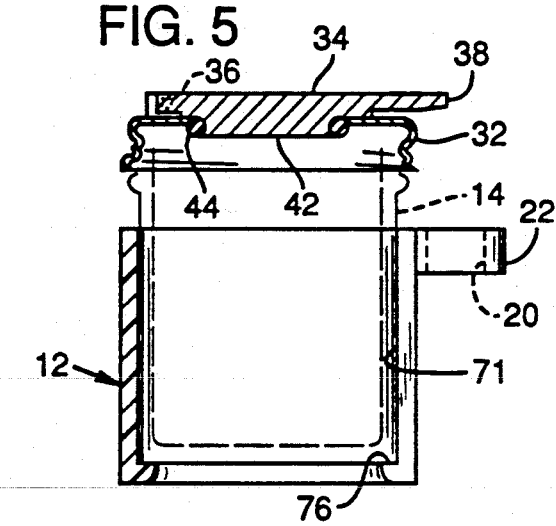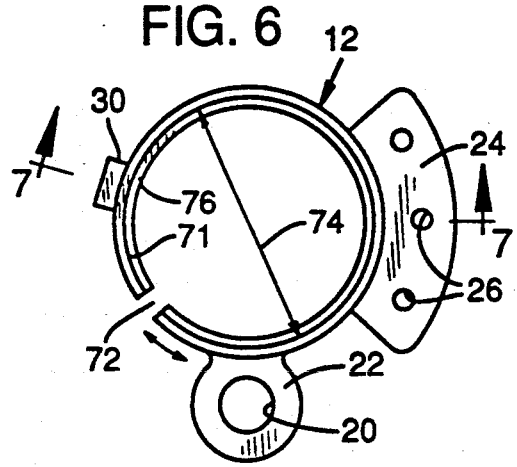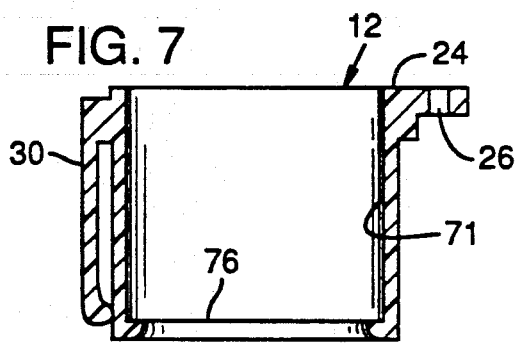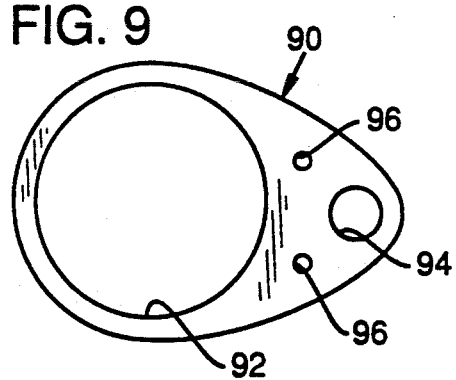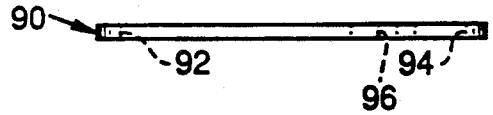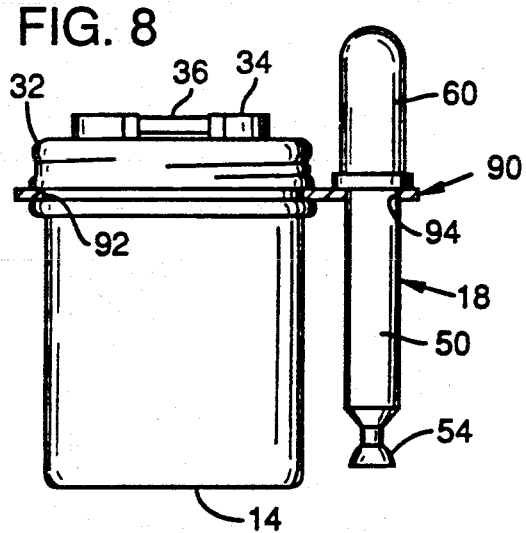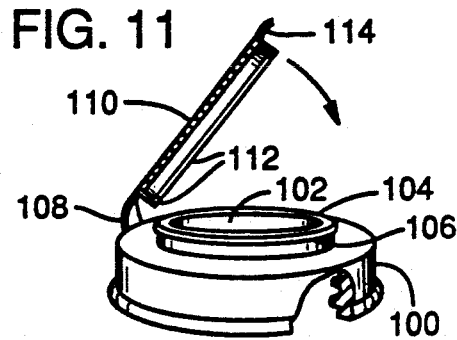

METHOD AND APPARATUS FOR HANDLING SALMON EGGS

BACKGROUND OF THE INVENTION

The present invention relates to devices for handling salmon eggs and similar individual pieces of bait for fishing, and to a device for removing salmon eggs individually from a jar and holding an individual salmon egg while it is placed properly on a fishhook for use as bait.

Salmon eggs and other items used as fish bait may be slippery and difficult or uncomfortable to handle. In particular, salmon eggs, used frequently as bait, are difficult to remove individually from the small jars in which they are commonly sold, and are difficult to hold securely in one's fingers while a hook is placed in the egg in such a way that the hook is hidden well enough, yet neither splits the egg nor permits the egg to be too easily knocked free from the hook.

People usually prefer to minimize handling of fishing bait. This is because the bait may be undesirably messy and may leave an odor on one's hands, and also because the effects of handling, particularly the scent of a human, may make the bait less attractive to the fish.

Several types of bait, such as salmon eggs, grubs, marshmallow pieces, and the like are often sold in small glass jars with screw-on covers. Such covers are not particularly convenient to use, since leaving the cover off the jar may result in the contents of the jar being spilled or becoming dried out, while having to unscrew the cover each time a new piece of bait is needed is time consuming and becomes tiresome. On the other hand, it is inconvenient to carry a small open jar of bait while moving along a stream bank in order to fish at different locations, and it is impractical to carry an uncovered jar of bait while wading and fishing.

In the past, various devices have been invented to deal with some of these concerns. Sowards U.S. Pat. No. 4,226,335 discloses a device attachable to a user's belt for carrying a supply of salmon eggs. The device is intended to provide eggs individually, but is mechanically somewhat complex, and the eggs must be loaded into the device from the jar in which the eggs are normally sold.

Walker U.S. Pat. No. 4,428,146 discloses a simpler dispenser for salmon eggs, but the dispenser depends on the ability of the individual eggs t move through a narrow neck. The device holds each egg while it is hooked, but would apparently permit eggs to spill from the dispenser or to dry out within it. As with the Sowards device, salmon eggs must be loaded into the device from the container in which they are purchased by the fisherman.

Wiltrout U.S. Pat. No. 4,133,452 discloses a salmon egg dispenser which requires the eggs to be loaded into a slender tube. Individual eggs are dispensed from the lower end of the tube by use of a plunger. The device apparently requires the eggs, once dispensed, to be held in one's hand while they are hooked.

Cointment U.S. Pat. No. 4,332,408 discloses a device resembling a medicine dropper, for use in removing and replacing soft contact lenses on a human eye. In the Cointment device a squeeze bulb is utilized to provide suction for holding a contact lens in a soft, easily deformable cup mounted on a tubular body at the end opposite the squeeze bulb.

What is needed, then, is a device for easily removing individual salmon eggs or other individual pieces of fishing bait directly from a small jar or similar container, and for holding such an individual salmon egg securely while it is placed properly on a fishhook for use as bait. It is also desirable to have a way to keep such a device together with a container of bait such as salmon eggs so that the bait and the device for placing individual pieces of it on a fishhook are readily available and accessible for use by a fisherman, either on a stream bank or while wading in the stream.

SUMMARY OF THE INVENTION

The present invention provides a bait handling tool including a handle or stem supporting a small bowl defining a socket of an appropriate size for receiving and holding a single salmon egg or other small piece of bait, together with an associated device for selectively reducing pressure within the socket, to hold a single salmon egg securely, yet releasably, as the egg is removed from a container and a fishhook is inserted properly into the egg for its use as bait. Preferably, a holder is also provided to fasten the bait handling tool conveniently to a jar of bait, keeping it ready for use.

In one embodiment of the bait handling tool, a small tubular body, or stem, carries the bowl at one end, while a rubber squeeze bulb similar to those used in medicine droppers and the like is attached to the other end of the tubular body. The tubular body interconnects the squeeze bulb with the interior of the socket through a hole defined in the socket, so that releasing the squeeze bulb from a pinched condition reduces pressure in the socket so that ambient air pressure will urge a single salmon egg or other small piece of bait into the socket and hold it there while it is being placed on a fishhook.

The bowl defining the socket is of material hard enough that it will not be penetrated readily by the point of a fishhook no pushed out of shape in the process of picking up an egg or while a fishhook is inserted into the egg or other piece of bait held in the socket.

In a preferred embodiment of the invention, the bait handling tool is accompanied by a generally cylindrical resilient holder for a jar of salmon eggs or other fishing bait, gripping the jar resiliently and enclosing it protectively, with a clip being provided on the holder to fasten the holder to a fisherman's clothing.

In a preferred embodiment of the invention, a special cover is also provided for the bait jar, and an associated lid can be flipped open readily to permit insertion of the bait handling tool through an opening in the cover to remove a single egg or other piece of bait from the jar, after which the lid can be quickly and easily closed.

It is therefore an important object of the present invention to provide an improved bait handling tool and a method for its use for handling salmon eggs and other small individual pieces of fishing bait.

It is another object of the present invention to provide an improved tool for easily and quickly removing a single salmon egg or other small piece of bait from a container and holding the single egg or other piece of bait securely while it is placed properly on a fishhook.

It is a principal feature of the present invention that it provides a bait handling tool including a bowl defining a socket mounted on an end of a tubular stem defining a conduit interconnected with the interior of the socket so as to reduce the pressure within the socket selectively and thus apply a pressure differential to an egg or other individual piece of bait to hold it in the socket while a fishhook is inserted into the piece of bait.

Another important feature of the present invention is the provision of a carrier for holding a jar of bait such as salmon eggs readily available on the person of a fisherman together with the bait handling tool, for use in removing a single fish egg or other piece of bait from the container and placing it on a fishhook for use.

Yet a further feature of one embodiment of the present invention is a replacement cover for use with a commercially available bait jar and including a quickly openable and reclosable lid to provide access to the bait within the jar more conveniently than the cover can be unscrewed from the top of the jar.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a perspective view of a jar of salmon eggs provided with a replacement cover and held in a carrier together with a bait-handling tool in accordance with the present invention.

FIG. 2 is an exploded view showing the jar of salmon eggs, the carrier, bait-handling tool, and the replacement jar cover shown in FIG. 1.

FIG. 3 is a sectional view of the jar, jar holder and replacement cover, together with the bait handling tool of FIG. 1, taken along line 3—3.

FIG. 4 is a partially cut-away view, at an enlarged scale, of the bait holder tool shown in FIGS. 1-3.

FIG. 5 is a sectional view of the bait jar holder and replacement cover shown in FIG. 1, taken along line 5—5.

FIG. 6 is a top view of the bait jar holder shown in FIG. 1.

FIG. 7 is a sectional side view of the bait jar holder shown in FIG. 1, taken along line 7—7 of FIG. 6.

FIG. 8 is a side elevational view of a bait jar, with a bait handling tool similar to that shown in FIG. 1 attached to the jar by an attachment device of a different form.

FIG. 9 is a top plan view of the attachment device shown in FIG. 8.

FIG. 10 is a side view of the attachment device shown in FIG. 9.

FIG. 11 is a perspective view o a molded plastic cover for a bait jar which is another embodiment of a portion of the invention.

DETAILED DESCRIPTION OF THE INVENTION

Referring first to FIGS. 1-3 of the drawings, in FIG. 1 a combination of bait handling apparatus 10 embodying the invention includes a bait jar holder 12 in which a jar 14 of salmon eggs 16 is held. A bait handling tool 18 is carried by the bait jar holder 12, extending downward through an opening or loop 20 defined by an arm 22 extending from the jar holder 12. A horizontal bracket 24 defines several holes 26 as locations for attaching such items as a snap swivel 28 or spare hooks to keep them conveniently available.

A clip 30 on a rear side of the bait jar holder 12 (see FIGS. 1, 2 and 7) includes a downwardly extending arm which can be used to engage a belt or another convenient part of a person's clothing, to attach the bait jar holder 12 so that the bait is conveniently ready for use while a person is wading and cannot rest the jar 14 on the ground within reach.

A replacement cover 32 which forms a further part of a preferred embodiment of the invention is located atop the jar 14 in place of a conventional sheet metal screw-on cover ordinarily found on a commercially available jar of bait. As may be seen best in FIG. 2, a jar such as the jar 14 is normally provided with a helically threaded upper portion 46, and the cover 32 is provided with mating interior threads 48, as shown in FIG. 3. The cover 32 defines an opening 40, and an easily opened lid 34 covering the opening 40 is attached to the cover 32 by a hinge 36. A tang 38 is provided on the lid 34 to aid in lifting it. A central portion 42 of the lid protrudes downwardly into the opening 40 when the lid 34 is closed, and an O-ring 44 is fitted to the lid 34, surrounding the central portion 42 to provide a sealing closure to prevent drying of the salmon eggs 16 or other bait contained within the jar 14. The O-ring 44 additionally provides an over-center, or snap-like, retention of the lid 34 in a closed condition as shown in FIGS. 2 and 3.

Referring next to FIG. 4, the bait holder 18 includes an elongate tubular body, or stem, portion 50, defining a conduit 52 extending centrally therethrough. At one end of the body 50 is a bowl 54, defining a substantially hemispherical socket 56. The conduit 52 communicates with the interior of the socket 56 through a reduced diameter portion 59 of the conduit 52 and an opening 58 defined in the bottom of the socket 56.

At the opposite end of the stem portion 50 a squeeze bulb 60 closes the open end of the conduit 52 defined at that end of the body portion 50. The squeeze bulb 60 is of a resilient material, such as rubber, which, once squeezed, tends to restore itself to the shape shown in FIG. 4, thus causing a reduced pressure within the interior of the squeeze bulb 60 and tubular conduit 52, to draw material into the interior of the bait holder 18 through the opening 58 in the bottom of the socket 56.

The stem 50 is of a convenient size for handling and use of the tool 18 to reach the eggs 16, with a length 62 such as about 2.5 inches chosen to permit the bowl 54 to reach the bottom of the jar 14 through the opening 40, with the squeeze bulb 60 located conveniently outside the jar 14. The exact sizes of the bowl 54 and the socket 56 are chosen to accommodate the usual size of the salmon eggs 16, or other bait for which the particular bait 18 is intended to be used. For example, the substantially hemispherical socket 56 may have a diameter 64 of 0.28 inches, while the opening 58 and reduced diameter portion 59 could have a smaller diameter 66 of about 0.089 inch.

Preferably, a circumferential groove 68 is formed on the exterior of the body portion 50 and an inwardly projecting lip 70 provided at the mouth of the squeeze bulb 60 fits matingly within the groove 68 to retain the squeeze bulb 60 in place on the body 50.

The body 50 and bowl 54 may be made by casting or machining a suitably hard metal or plastic material, for example, or the entire assembly including the equivalent of the squeeze bulb 60 may be molded integrally of an appropriate material such as a suitably tough yet resiliently flexible plastic. It is important, however, that the bowl 54 be of material which is hard enough to resist puncture by the sharpened point of the fishhook being used to engage a salmon egg 16 or other bait held within the socket 56 during use of the bait handler 18.

The bait jar holder 12 includes a cylindrical wall 71 and may be manufactured of a suitably resilient plastic material, such as a high density PVC of the sort used as PVC piping. Preferably, the wall 71 is a nearly complete cylinder, interrupted by a slit 72, with an interior diameter 74 slightly smaller than the diameter of the cylindrical bait jar 14, so that the cylindrical wall will resiliently grip the outside surfaces of the jar 14. A radially inwardly extending shelf 76 is provided at the bottom of the cylindrical wall to prevent the jar 14 from sliding downward too far within the jar holder 12. The holder 12 thus surrounds nearly the entire outside of the glass jar 14 as protection against breakage, should the holder 12 and jar 14 of bait be dropped.

As shown in FIGS. 8, 9, and 10, a retainer 90 may be used to hold the bait handling tool 18 attached to a jar 14, where a fisherman intends only to rest the jar 14 of bait on the ground or carry it within a boat, and thus does not need to have the jar 14 of bait attached to his clothing. The retainer 90 may be manufactured, for example, of a resilient flexible plastic sheet material defining an opening 92 of a size to grip the jar 14 snugly, preferably fitting the minor diameter of the threads on the jar 14, so that the cover 32 can be attached over the retainer 90. The retainer 90 also defines a smaller opening 94 of a size appropriate to receive the body 50 of the bait holder 18 slidably, suspending it alongside the jar 14 to prevent it from being lost or becoming dirty, and one or more holes 96 for attachment of spare hooks, etc.

As may be seen in FIG. 11, a cover 100 usable instead of the cover 32 may be molded of a tough, resilient plastic material to fit the threaded top portion 46 of a bait jar 12. The cover 100 defines an opening 102 at the top of a neck 104 which has a radially outwardly extending lip 106. A flexible strip 108 acts as a hinge and retains a mating lid 110 including a radially inwardly protruding lip 112 which matingly fits resiliently over the neck 104 and lip 106 to secure the lid 110 in a position closing the opening 102. A tang 114 is provided to facilitate quickly opening or closing the lid 110 to provide access to the salmon eggs 16 or other small pieces of bait contained within the jar 14 covered by the cover 100.

As the bait handling tool 18 described herein is designed primarily for use with salmon eggs, its use will be described with reference to the salmon eggs 16, although it will be understood that the manner of use of the tool 18 would be essentially the same for handling such other small, fairly uniform pieces of bait such as grubs, small marshmallow pieces, kernels of corn, and the like.

When carrying a bait jar 14 in the holder 12, a single finger may be used to engage the tang 38 and raise the lid 34 above the cover 32 to expose the opening 40. Raising the lid 34 provides ample room to insert the bowl 54 of the bait handling tool 18 into the jar 14, without too great a likelihood of spilling the eggs 16.

As the bowl 54 of the bait handling tool 18 is inserted into the jar 14, the squeeze bulb 60 should be compressed. So long as there are more than a few salmon eggs 16 within the jar 14, no special effort will be required for placement of the bowl 54 so that a salmon egg 16 will enter into the open socket 56. Thus, once the bowl 54 is felt to be in contact with eggs 16 within the jar 14, pressure on squeeze bulb 60 can be released. A single salmon egg 16 will then be moved into position against the surface of the interior of the socket 56. Thereafter, a pressure differential will exist between the surrounding air and the reduced pressure within the squeeze bulb 60, conduit 52, and socket 56 of the bait handling tool 18, caused by the squeeze bulb 60 attempting to resume its relaxed shape and size. The pressure differential provided by the use of the squeeze bulb 60 will hold the salmon egg 16 securely within the socket 56 so long as the egg 16 can rest tightly against the interior surface of the socket 56. Because of the hinged attachment of the lid 34, it can be returned to close the opening 40 conveniently by use of the thumb, as the bait handling tool 18 is withdrawn from the opening 40.

With the salmon egg 16 held in the socket 56 the bait handling tool 18 facilitates placing the salmon egg 16 in the most desirable position on the point 80 of a fishhook 82, as indicated in FIG. 4. This is most easily accomplished by holding the fishhook 82 substantially stationary with its point 80 directed generally upward, while the bait handling tool 18 is manipulated to push the fish egg 16 onto the point 80 until the point 80 encounters the surface of the interior of the socket 56. The squeeze bulb 60 should then be squeezed again to release the egg 16 from the socket 56.

While use of the squeeze bulb 60 or its functional equivalent is preferred, the bait handling tool 18 may also be used, with somewhat less effectiveness, by using one's finger to close the conduit 50 after an egg 16 is received in the socket 56 to remove the egg 16 from the jar 14, if the egg 16 is of a size similar enough to that of the socket 56.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A method for removing an individual piece of bait from a container and placing it on a fishhook, comprising:
    (a) inserting a bowl defining a small socket into a container including a plurality of pieces of bait;
    (b) engaging a single piece of bait with said socket surrounding at least a portion of said piece of bait;
    (c) imposing a pressure differential upon said piece of bait by reducing pressure within said socket;
    (d) utilizing said pressure differential to hold said piece of bait in said socket;
    (e) thereafter removing said bowl from said container with said piece of bait held in said socket, while maintaining said pressure differential;
    (f) inserting a point of a hook into said piece of bait while said piece of bait remains held in said socket; and
    (g) releasing said piece of bait from said socket by reducing said pressure differential.

2. The method of claim 1, wherein the step of imposing a pressure differential includes the step of utilizing a resilient squeeze bulb to reduce pressure within said socket.

3. In combination with a bait jar containing a plurality of pieces of fishing bait such as salmon eggs, apparatus for facilitating use of small, individual, generally uniform pieces of bait, the apparatus comprising:
    (a) a jar holder protectively holding said bait jar and including fastening means for removably fastening said jar holder to an article of clothing being worn by a person;

(b) a bait handling tool, including an elongate stem portion having a pair of opposite ends and a bowl attached to one of said opposite ends, said bowl defining a socket of a size appropriate for snugly receiving and holding a single one of said pieces of bait, said bait handling tool defining a conduit communicating with the interior of said socket and including pressure reducing means interconnected with said conduit for selectively reducing pressure within said socket; and (c) attachment means for removably fastening said bait handling tool to said jar holder.

4. The apparatus of claim 3, wherein said fastening means includes resilient clip means for fitting over a belt.

5. The apparatus of claim 3 wherein said jar holder comprises a resilient wall defining a majority of a cylinder, said wall having a bottom and including an inwardly directed ledge extending along said bottom of said wall.

6. The apparatus of claim 3 wherein said jar includes a mouth, the apparatus further including cover means for partially covering said mouth of said jar, said cover means defining an opening smaller than said mouth but large enough to permit said bowl and part of said elongate stem portion of said bait handling tool to be inserted therethrough, and including lid means attached to said cover means for selectively closing said opening.

7. The apparatus of claim 6 wherein said cover means is of molded resiliently flexible material, including resilient latching means for selectively keeping said lid in a position closing said opening.

8. The apparatus of claim 3, further including a bracket attached to said jar holder, said bracket defining a plurality of aperture means therein for attachment of articles to said jar holder.

* * * * *